No. 766,523. PATENTED AUG. 2, 1904.
A. H. REID.
PASTEURIZING APPARATUS.
APPLICATION FILED JAN. 30, 1904.
NO MODEL.

WITNESSES
INVENTOR

No. 766,523.

Patented August 2, 1904.

UNITED STATES PATENT OFFICE.

ALBAN H. REID, OF PHILADELPHIA, PENNSYLVANIA.

PASTEURIZING APPARATUS.

SPECIFICATION forming part of Letters Patent No. 766,523, dated August 2, 1904.

Application filed January 30, 1904. Serial No. 191,264. (No model.)

*To all whom it may concern:*

Be it known that I, ALBAN H. REID, of Philadelphia, county of Philadelphia, and State of Pennsylvania, have invented a new and useful Improvement in Pasteurizing Apparatus, of which the following is a specification.

This invention relates to pasteurizers designed more particularly for treating milk in large quantities in dairies and embodying usually a heating vessel to contain the milk to be treated and a surrounding inclosed space or chamber in which the heating medium is introduced and circulated in proximity to the heating vessel.

The invention is directed particularly to the manner of introducing the heating medium into the space surrounding the heating vessel, to the end that there shall be a more uniform distribution of the heating medium, a more perfect heating of the vessel containing the milk, and an effective circulation of the heating medium.

With these ends in view my invention consists in introducing the heating medium at different points in the surrounding chamber. The points of introduction may be at intervals around the chamber or at intervals in the vertical length of the chamber one above the other, or both, as illustrated in the accompanying drawings, where it will be seen that the heating medium enters at equal intervals around the chamber and at upper and lower and intermediate points, which is the construction I prefer to adopt in carrying my invention into practice.

Figure 1:
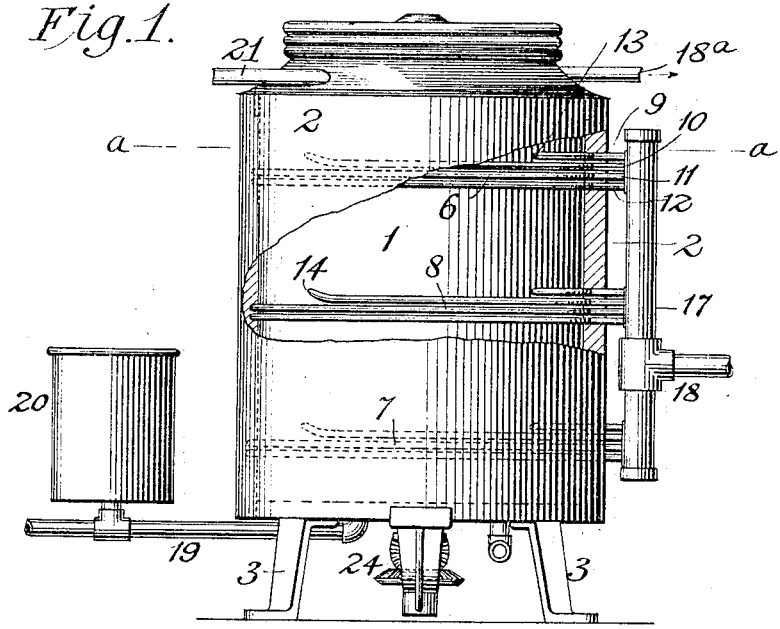
Figure 2:
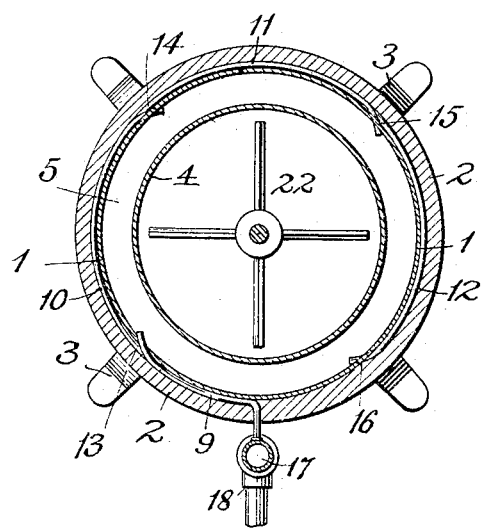
Figure 3:
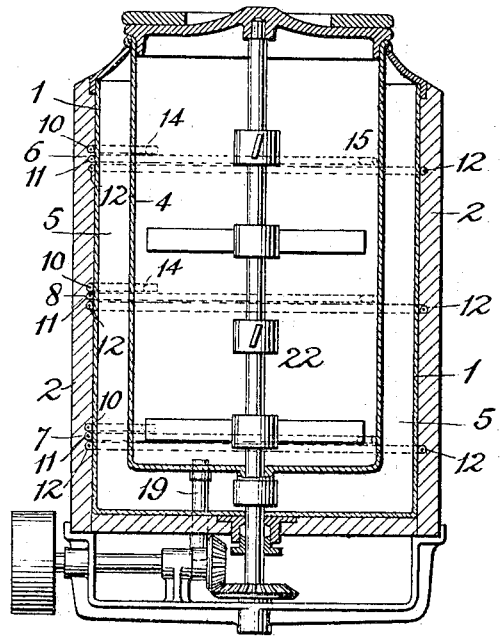

In the drawings, Figure 1 is a side elevation of my improved pasteurizer. Fig. 2 is a horizontal sectional plan view on the line *a a* of Fig. 1. Fig. 3 is a vertical longitudinal sectional elevation of my improved device.

Referring to the drawings, 1 represents a cylindrical outer casing formed with a heat-retaining packing 2, preferably of wood, which casing is sustained by suitable legs 3.

4 represents a heating vessel to contain the milk to be pasteurized, formed of metal so as to quickly absorb the heat from the heating medium. This vessel is inclosed within the casing 1 and is of such relative size that there will be left between it and the casing an annular surrounding space or chamber 5 for the circulation of the heating medium.

The heating medium enters this chamber from a series of pipes arranged, preferably, in three groups, an upper one, 6, a lower one, 7, and an intermediate group 8, and each group comprises, preferably, four pipes 9, 10, 11, and 12, arranged one above the other and entering the annular chamber at intervals divided equally around its circumference, as clearly indicated in Fig. 2. In this figure it will be observed that the pipes 9 of the several groups extend but part way around the casing, and they enter the annular chamber at points 13. Pipes 10 extend farther around the casing and enter the chamber at points 14, while the other pipes of the group extend correspondingly farther around the casing and enter the chamber, respectively, at points 15 and 16. These pipes of the several groups are connected with and receive their supply of the heating medium from a common chamber in the form of a vertical pipe or column 17, arranged at the side of the casing and suitably sustained in position, and the heating medium is supplied to this column from a suitable source of supply through an inlet-opening 18. The annular chamber is provided with an outlet-opening 18ᵃ in order to facilitate the proper circulation of the heating medium introduced through the supply-pipes.

I prefer to arrange the ends of the pipes where they enter the annular chamber at an inclination or tangent and pointing in the same general direction of the circumference of the chamber, so that the heating medium will partake of a whirling motion and will circulate rapidly and freely around the heating vessel.

As a result of the construction described there is a uniform and thorough distribution of the heating medium in the annular chamber, its entrance in a heated and fresh condition at many different points insuring that every part of the heating vessel will be subjected to an equable and uniform temperature, the result being that a maximum amount of heat will be imparted to the heating vessel throughout its exposed surface.

Either steam or water may be employed as the heating medium; but I prefer to use water, the circulation and handling of which is rendered feasible by reason of its introduction into the annular chamber in the manner shown and described.

It will of course be understood that the number of groups of pipes for the supply of the heating medium may be increased or diminished, and it will be further understood that the number of pipes of each group may be greater or less and that their points of entrance into the annular chamber may be varied, without departing from the limits of my invention, the essence of which resides in introducing the heating medium at a plurality of points, to the end that there may be a more uniform distribution and a more effective and equable heating of the vessel containing the milk.

The milk to be treated may be supplied to the vessel in any suitable and appropriate manner—for instance, through a pipe 19, extending through the bottom of the surrounding casing and entering the bottom of the heating vessel, which pipe has connected with it a tank 20. The contents of the heating vessel after it has been treated may be poured off through a discharge-pipe 21 at the top of the vessel. To prevent scorching of the contents of the heating vessel, it is usual to provide an agitator or beater 22, as shown in Fig. 3, mounted within the heating vessel and adapted to be rotated through the medium of suitable gearing 24.

Having thus described my invention, what I claim is—

1. In a pasteurizing apparatus, the combination with a heating vessel, of an outer casing therefor provided with a chamber surrounding the vessel, and a plurality of ducts for a heating medium, said ducts being arranged severally in different vertical planes and extended relatively varying distances around the casing and entering the chamber at different relative marginal points.

2. In a pasteurizing apparatus, the combination with a heating vessel, of an outer inclosing casing therefor provided with a chamber surrounding the vessel, and a plurality of groups of ducts for a heating medium, said groups of ducts being arranged severally in different vertical planes and having the ducts of each group extended relatively varying distances around the casing and entering the chamber at different relative marginal points.

3. In combination with a heating vessel provided with a surrounding chamber, a plurality of pipes for the introduction of the heating medium, said pipes being independent of each other and extending different distances respectively around said chamber from a common starting-point and entering said chamber at their terminal points, and a supply-chamber connected with all of said pipes at the starting-point.

4. In a pasteurizing apparatus the combination with an outer inclosing casing, of a heating vessel situated therein with a space between them, a series of horizontally-arranged pipes at the outer side of the casing entering the space at intervals around the same, and means for supplying a heating medium for said pipes.

5. In a pasteurizing apparatus the combination with an outer inclosing casing, of a heating vessel situated therein with an intermediate space for the circulation of a heating medium, a vertical column or chamber at the side of the casing, means for supplying a heating medium thereto, a plurality of groups of pipes connected with said column one above the other, said groups each comprising a plurality of pipes extending around the casing different distances and entering the intermediate space at different points.

In testimony whereof I hereunto set my hand, this 16th day of January, 1904, in the presence of two attesting witnesses.

ALBAN H. REID.

Witnesses:
 W. H. RAMSEY,
 FRANK D. GRAHAM.